United States Patent Office 3,684,547
Patented Aug. 15, 1972

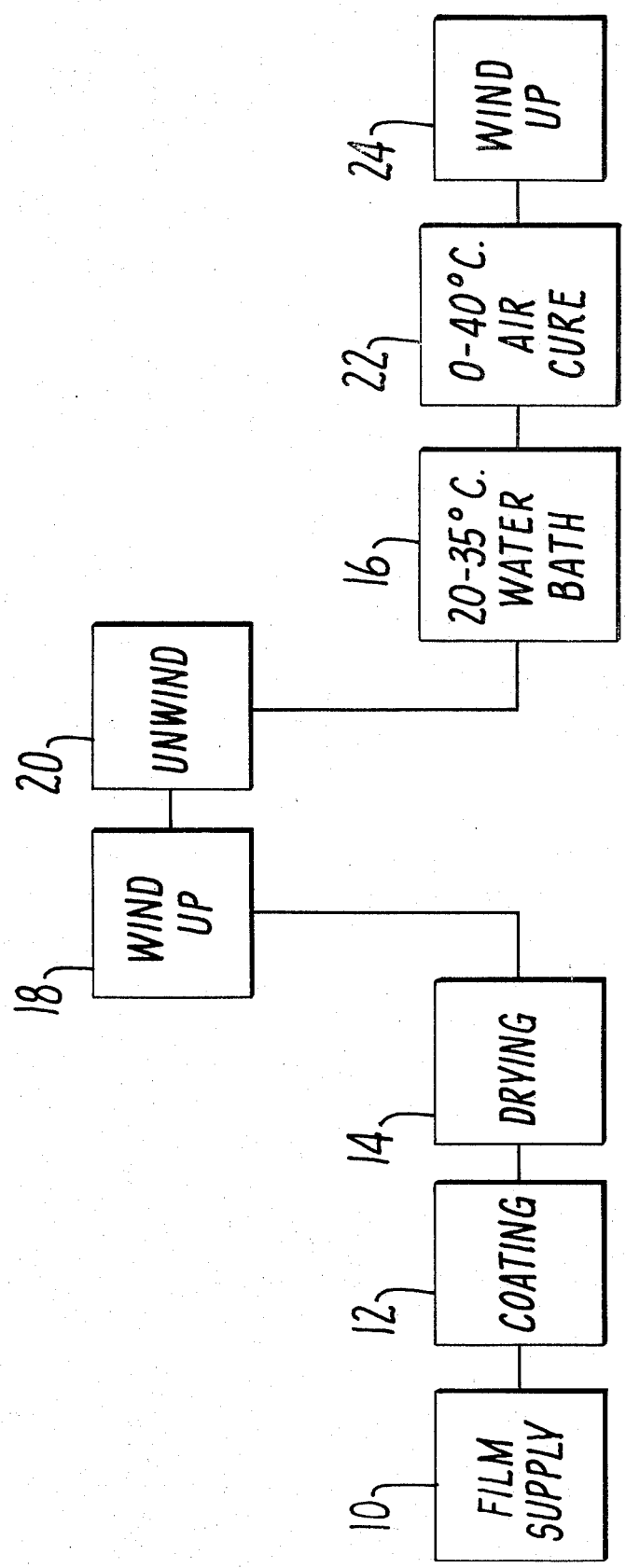

3,684,547
METHOD OF MAKING VESICULAR FILM
Gary L. Bunas and Ross P. Clark, San Jose, Calif., assignors to Memorex Corporation, Santa Clara, Calif.
Filed Apr. 10, 1970, Ser. No. 27,305
Int. Cl. C03c 3/26; G03c 1/54
U.S. Cl. 117—34                      1 Claim

ABSTRACT OF THE DISCLOSURE

A method of making vesicular film comprising drying a solution of a diazonium salt and polyvinyl formal onto a flexible substrate, passing the coated substrate through a water bath at 20° to 35° C., removing surface water from the film, and then passing the coated substrate through air at 0° to 40° C. for at least thirty seconds before winding the finished film.

SUMMARY OF THE INVENTION

Vesicular films may be made by coating onto a flexible support polyvinyl formal containing photosensitive diazonium salts which decompose under exposure by actinic light to liberate nitrogen. Subsequent heating of the film permits the nitrogen to produce gas bubbles in the film in an image of the original exposure.

In accordance with this invention, substantial improvement in photographic sensitivity is obtained for a vesicular film made of polyvinyl formal by the combined effect of low temperature water treatment of film and low temperature air curing of the film.

The use of polyvinyl formal for making vesicular films is known as shown, for instance, in British Pat. No. 850,954. Additionally, it is known as shown, for instance, in U.S. Pat. No. 3,149,971 that the sensitivity of vesicular films may be increased by heating the films to temperatures in excess of 100° C. in the presence of aqueous media.

The low temperature water treatment and low temperature air cure of this invention produce a joint effect on the film which is unattainable by use of either the low temperature water treatment or the low temperature air cure separately, and the two treatments performed separately on the film do not produce individual effects whose sum is comparable to the joint effect of the two treatments performed together.

DETAILED DESCRIPTION

The polyvinyl formal used in accordance with the invention is a known polymer which may be made by hydrolysis of polyvinyl acetate followed by reacting the hydrolyzed polymer with formaldehyde. The hydrolysis reaction and the subsequent reacting with formaldehyde may be incomplete to the extent that the final polymer contains appreciable amounts of hydroxyl groups and acetate groups with a preponderance of formal groups. The preferred polyvinyl formal for use in this invention is a product sold by the Monsanto Chemical Company under the designation Formvar 12/85 containing the following weight percents of hydroxyl, acetate and formal on the basis of calculated amounts of polyvinyl alcohol, polyvinyl acetate and polyvinyl formal in the polymer:

|  | Weight percent |
|---|---|
| Hydroxyl | 5.5–7.0 |
| Acetate | 22–30 |
| Formal | 70 |

Molecular weight—26,000–34,000

The preferred diazonium salt for use in this invention is 4-morpholino-2,5-diethoxybenzenediazonium chlorozincate having the general formula:

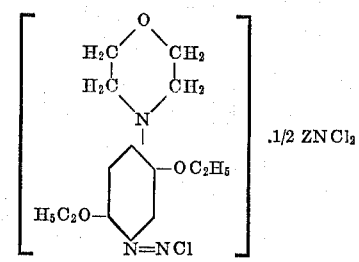

The polyvinyl formal and diazonium salt are preferably combined together in a solution, and a stabilizer such as p-toluene sulfonic acid is preferably incorporated into the solution along with a wetting agent such as Na-di-(2-ethylhexyl)-sulfosuccinate sold under the trademark "Aerosol OT" which also tends to improve the sensitivity of the film.

The film components are combined together in a coating solution from which the vesicular film is prepared as illustrated in the attached drawing in which:

The figure is a flow chart of the process of this invention by which vesicular film is made.

Referring now in detail to the figure, a continuous web of a flexible support is advanced from a film supply 10 through a coating station 12 to a drying station 14. The continuous web is preferably optical grade polyethylene glycol terephthalate preferably covered with a subbing layer made of a terpolymer of vinylidene chloride, acrylonitrile, and vinyl chloride.

Conventional coating and drying equipment may be employed at the coating and drying stations 12 and 14 though preferably the coating station 12 includes an extrusion coater where coating material is extruded to a controllable thickness onto the film, and the drying station 14 preferably includes a series of oven compartments through which the film is advanced without contact with any mechanical parts while the drying conditions in the oven become more severe as the film moves progressively through the oven.

The film may be advanced directly from the drying stage 14 to the water treatment bath 16 of this invention, but if desired for processing convenience, a film may first be wound at a winding station 18 and later unwound at an unwinding station 20 with intermediate storage of the film between the stations 18 and 20 if desired.

The dried vesicular film is passed to water treatment station 16 from drying oven 14 where the film passes along a continuous path through a water bath. The temperature of the water bath should be maintained within the range of 20° to 35° C. Where circulating water from a cold supply is used in the bath, a heater may be provided to raise the water temperature to ambient temperature, and where the wind-up and unwinding stations 18 and 20 are not used, refrigeration may be provided for the bath 16 to prevent temperature build up which would result from thermal carry-over from oven 14. If water treatment times of less than about 30 seconds are employed, insufficient improvement in film sensitivity is obtained. If water treatment times in excess of about 500 seconds are employed, partial fogging of the film may be encountered occasionally.

As the film web passes out of water treatment station 16, surface water is removed from the film in any convenient manner as by application of an air knife to the film. Droplets of water must not remain on the film because they will cause spotting of the film during subsequent treatment.

Immediately after the film passes out of water treatment station 16, it passes through an air curing station 22 and hence to a wind-up station 24.

In air curing station 22, the water treated film is passed through air at a temperature between 0° and 45° C. for a period of at least thirty seconds and preferably about 100 seconds. The time duration of air cure can be longer than thirty seconds, but no appreciable added benefits are obtained by extending the air cure time beyond ten minutes, and very substantial losses in film sensitivity will result where the air cure time is reduced below thirty seconds. In the latter regard, it has been found that the low temperature water treatment without subsequent air cure produces vesicular film in which the film sensitivity is not only low, but also unpredictable. On the other hand, where both low temperature water treatment and low temperature air cure are employed, high film sensitivities are obtained and may be reproduced in different batches of film given similar treatments.

The low temperature air cure is preferably accomplished with special equipment like that used for a drying oven with this equipment mounted to receive the film directly after its egress from the water bath with the equipment operated without the application of oven heat so that the film passes through air at ambient temperature and humidity conditions.

The temperature in air cure station 22 is preferably maintained around 20° C. If the temperature in this station is raised above 40° C., the sensitivity of the film is reduced dramatically.

The invention may be understood more fully by reference to the following example in which parts given are parts by weight.

EXAMPLE

A low shear mixing vessel was charged with 200 parts of toluene to which was added two parts of a surfactant available commercially under the trademark "Aerosol OT," 100 parts of Formvar 12/85, and 300 parts of methyl "Cellosolve," and the mixer was operated for a period of two and one-half hours until a uniform solution was produced.

The surfactant Aerosol OT is Na-di(2-ethylhexyl)sulfosuccinate.

One part of p-toluene sulfonic acid was then added to the solution and the solution was stirred for aout 10 minutes until the stabilizer was dissolved.

In a separate container, five parts of 4-morpholino-2,5-diethoxybenzenediazonium chlorozincate were dissolved in 40 parts of methanol at 40° C. with agitation.

Immediately after the diazonium salt was dissolved, the diazo solution was added to the polymer mixture, and the mixture was stirred for thirty minutes at approximately 30° C.

This solution was then degassed by permitting the solution to stand at reduced pressure for nine hours, and the mixture was then applied to a treated polyester base film to yield a dry coating thickness of 375±25 microinch.

The polyester base film was pretreated by coating the film with the above-mentioned terpolymer to a thickness of thirty microinches.

The coating was dried by passing the coated base film through air for ten seconds at amient temperature followed by 32 seconds at 75° C. followed by two and one-half minutes at 110° C., and following this drying procedure, the coated base film was wound up.

The coated base film prepared as described above had a very low photographic sensitivity, and the sensitivity was improved by post-treating the film as follows: The coated base film was unwound and passed through a bath of deionized water at 30° C. in which the film had a residence time of one minute. As the film emerged from the bath, excess water was removed from the surface of the film, and the film was then dried by advancing the film through air for 100 seconds following which the film was slit to width and packaged for use.

Optical projection density of this film was measured on a MacBeth densitometer after a sample of the film was exposed to ultraviolet light at standard conditions and developed by heating the film to approximately 130° C. for about one-half a second. The densitometer gives a zero reading for 100% light transmission through the film and a reading of 3.0 for essentially zero light transmission through an exposed and developed part of the film. The film prepared as described above and developed indicated a maximum optical density on the MacBeth densitometer of 2.11±.01.

Tests on the MacBeth densitometer have indicated that the film exposed and developed at station 18 prior to water bath treatment and air cure has a maximum optical density of about 0.4 or less than 20% of the optical sensitivity of films made in accordance with this invention.

While certain specific features and advantages of the invention have been described in detail herein, it is obvious that many modifications thereof may be made without departing from the spirit and scope of the invention.

What is claimed is:
1. The method of making a vesicular film which comprises:
   (A) coating a support film with a solution consisting essentially of a photosensitive material capable of liberating nitrogen under the influence of actinic light and polyvinyl formal in an organic solvent,
   (B) drying the coated support film,
   (C) advancing the dried coated support film through a bath of water at a temperature within the range 20–35° C. for at least 30 seconds but for less than 500 seconds and then removing surface water from the coated support film, and
   (D) then, prior to winding the film, immediately contacting the coated support film with air at a temperature in the range 0–40° C. for at least 30 seconds.

References Cited

UNITED STATES PATENTS

| 3,149,971 | 9/1964 | Baril et al. | 96—49 |
| 3,546,149 | 12/1970 | Fabian | 117—34 X |
| 3,137,576 | 6/1964 | Himmelmann et al. | 117—34 UX |
| 3,017,296 | 1/1962 | Stanley et al. | 117—34 X |

FOREIGN PATENTS 850,954  10/1960  Great Britain.

WILLIAM D. MARTIN, Primary Examiner

B. D. PIANALTO, Assistant Examiner

U.S. Cl. X.R.

96—49; 117—62, 119.2